(12) United States Patent
Minichmayr (10) Patent No.: US 10,136,313 B2
(45) Date of Patent: Nov. 20, 2018

(54) METHOD AND DEVICE FOR CONTROL OF A LOCK MECHANISM USING A MOBILE TERMINAL

(71) Applicant: TAPKEY GMBH, Vienna (AT)

(72) Inventor: Markus Minichmayr, Alkoven (AT)

(73) Assignee: TAPKEY GMBH, Vienna (AT)

( * ) Notice: Subject to any disclaimer, the term of this patent is extended or adjusted under 35 U.S.C. 154(b) by 222 days.

(21) Appl. No.: 14/406,061

(22) PCT Filed: May 29, 2013

(86) PCT No.: PCT/AT2013/050113
§ 371 (c)(1),
(2) Date: Dec. 5, 2014

(87) PCT Pub. No.: WO2013/181682
PCT Pub. Date: Dec. 12, 2013

(65) Prior Publication Data
US 2015/0119019 A1    Apr. 30, 2015

(30) Foreign Application Priority Data

Jun. 5, 2012 (AT) .............................. A 50222/2012

(51) Int. Cl.
*H04M 3/20*    (2006.01)
*H04W 12/04*   (2009.01)
(Continued)

(52) U.S. Cl.
CPC ........ *H04W 12/04* (2013.01); *G07C 9/00571* (2013.01); *H04M 1/7253* (2013.01); *H04W 4/80* (2018.02); *H04W 12/06* (2013.01)

(58) Field of Classification Search
CPC ..... H04W 12/06; H04W 4/008; H04W 12/04; G07C 9/00309; G07C 9/00571; H04M 1/7253
See application file for complete search history.

(56) References Cited

U.S. PATENT DOCUMENTS 6,263,432 B1    7/2001  Sasmazel et al.
6,678,731 B1    1/2004  Howard et al.
(Continued)

FOREIGN PATENT DOCUMENTS

CN    1489329    4/2004
EP    1336937    8/2003
(Continued)

OTHER PUBLICATIONS

Woo, T. Y. C., et al: "Designing a distributed authorization service", In Proceedings of. INFOCOM, Mar. 29, 1998, vol. 2, IEEE Press, pp. 419-429.

(Continued)

*Primary Examiner* — Ajit Patel
(74) *Attorney, Agent, or Firm* — Norton Rose Fulbright US LLP (57) ABSTRACT

The invention relates to a method and a device for the control of a locking mechanism (2) by a user (5) by means of a mobile terminal (1) comprising a user interface (4), means for establishing a local data connection (3) and means for establishing a connection to a network (6), in particular the Internet, wherein the locking mechanism (2) can be connected to the local data connection (3), wherein an identity provider (7) that can be connected to a network (6) and an authorization entity (8) that can be connected to a network (6) are provided, and wherein the mobile terminal (1) is designed to log in to the identity provider (7). In order to achieve a particularly simple and flexible control, the authorization entity (8) is designed for the issuance of a key (10) after the transmission of an authentication information from the identity provider (7) to the mobile terminal (1) and from the mobile terminal (1) to the authorization entity (8) in the network (6) and after verifying the authenticity of the (Continued)

user (5), with which key (10) the locking mechanism (2) can be opened.

22 Claims, 4 Drawing Sheets

(51) Int. Cl.
  *G07C 9/00* (2006.01)
  *H04M 1/725* (2006.01)
  *H04W 4/80* (2018.01)
  *H04W 12/06* (2009.01)

(56) References Cited

U.S. PATENT DOCUMENTS

| | | | |
|---|---|---|---|
| 2002/0178385 A1* | 11/2002 | Dent | G07C 9/00309 726/27 |
| 2003/0154170 A1 | 8/2003 | Komai | |
| 2003/0159031 A1* | 8/2003 | Muller | G06F 21/00 713/155 |
| 2006/0224901 A1* | 10/2006 | Lowe | H04L 63/062 713/186 |
| 2007/0200665 A1* | 8/2007 | Studerus | G07C 1/10 340/5.61 |
| 2010/0176919 A1 | 7/2010 | Myers | |
| 2011/0311052 A1* | 12/2011 | Myers | G07C 9/00103 380/270 |
| 2012/0280790 A1* | 11/2012 | Gerhardt | G07C 9/00309 340/5.61 |
| 2013/0249688 A1* | 9/2013 | Nguyen | G08B 25/08 340/539.13 |
| 2014/0292481 A1* | 10/2014 | Dumas | G07C 9/00111 340/5.61 |

FOREIGN PATENT DOCUMENTS

| | | |
|---|---|---|
| EP | 2085934 | 8/2009 |
| WO | WO2002/093502 | 11/2002 |
| WO | WO2003/073242 | 9/2003 |
| WO | WO2005/066908 | 7/2005 |
| WO | WO2007/126375 | 11/2007 |

OTHER PUBLICATIONS

Akram, H. I. et al: "User-centric Identity Management in Ambient Environments", International Journal on Advances in Intelligent Systems, vol. 2, No. 1, (2009), pp. 254-267.

Akram, H.: "Master Thesis—Secured Identity Management in Ambient Environments: Vulnerabilities and Proposed Remedies", Darmstadt University of Technology Department of Computer Science, Nov. 11, 2008.

* cited by examiner

METHOD AND DEVICE FOR CONTROL OF A LOCK MECHANISM USING A MOBILE TERMINAL

This application is a national phase application under 35 U.S.C. § 371 of International Application No. PCT/AT2013/050113 filed 29 May 2013, which claims priority to Austrian Patent Application No. A50222/2012 filed 5 Jun. 2012. The entire contents of each of the above-referenced disclosures is specifically incorporated by reference herein without disclaimer.

The invention relates to a method for the control of a locking mechanism by a user by means of a mobile terminal, wherein for the control of the locking mechanism a local data connection is established from the mobile terminal to the locking mechanism, and wherein for the issuance of a key for the opening of the locking mechanism by means of the mobile terminal a connection via a network, in particular the Internet, to an identity provider is created.

The invention further relates to a device for the control of a locking mechanism by a user by means of a mobile terminal comprising a user interface, means for establishing a local data connection and means for establishing a connection to a network, in particular the Internet, wherein the locking mechanism can be connected to the local data connection, wherein an identity provider that can be connected to a network and an authorization entity that can be connected to a network are provided, and wherein the mobile terminal is designed to log in to the identity provider.

The present invention relates to a method and a device by means of which the admission or access of physical individuals (persons, animals, robots) to an object or thing, or their use of an object or thing (e.g. automatic machines/vending machines) can be controlled.

The method uses as a conveying entity a mobile terminal (e.g. a smartphone, a computer, a tablet PC, a vehicle, etc.) which is suitable for establishing a local data connection—limited in time, where applicable—(subsequently called "local data connection", e.g. NFC, RFID, Bluetooth, WLAN) to the locking mechanism to be opened of the protected resource, as well as for creating a data connection (subsequently called "network connection", limited in time, where applicable) to at least one identity provider and to an authorization entity in the network. The mobile terminal comprises a user interface, typically a graphical display, a keyboard and/or a touchscreen, etc., for user interactions.

The usage of a mobile terminal for the control of locking mechanisms is already known. By said usage, the issuance of physical keys (conventional keys, RFID card, etc.) which is indispensable in most of the other methods is no longer necessary. But, nevertheless, conventional methods involve a relatively high expenditure concerning the checking of the identity and of the authorization of the user.

WO 2007/126375 A1 relates to a method and a device of the present type, wherein for the issuance of a key for the opening of the locking mechanism an authentication of the mobile terminal by means of a unique identification of the mobile terminal is carried out. Moreover, when the mobile terminal is changed an extensive maintenance of the relation between the mobile terminal and the authorization entity is required.

EP 1 336 937 A1 relates to a similar method for the control of a locking mechanism, wherein also a log-in and an authentication of the mobile terminal independent of the respective user of the mobile terminal is carried out.

The object of the present invention is to create a method and a device of the above-mentioned kinds for the control of a locking mechanism by means of a mobile terminal, by means of which a particularly simple and flexible control can be achieved.

With respect to the method, the inventive object is solved by the fact that the user authenticates himself/herself/itself by means of the mobile terminal at the identity provider, and that from the identity provider an authentication information is transmitted to the mobile terminal, and that the authentication information is transmitted to an authorization entity in a network, wherein with the authentication information a key is issued at the authorization entity after verifying the authenticity of the user, with which key the locking mechanism is opened. In contrast to known methods, the described method allows to delegate the authentication to one or several trusted entities (identity providers). Said delegation allows the granting of admission/access or use authorizations to established virtual identities. The mobile terminal uses at least one network connection as well as the user interface in order to carry out a log-in process at an identity provider by means of known technologies for the delegation of the user authentication (e.g. OAuth) and to query a key (virtual access key) for the opening of the locking mechanism from the authorization entity by means of the thus obtained authentication information. The local data connection is used subsequently in order to transmit the key to the locking mechanism and in order to release the locking mechanism. The method is suitable for locking mechanisms with a permanent data connection to the authorization entity as well as also for locking mechanisms without such a permanent data connection to the authorization entity. In contrast to conventional methods, the described method provides a substantial simplification of the use and management of admission or access systems. It allows that an admission or access authorization may be bound to an established virtual identity instead of to a physical medium (physical key or access card), or individually and newly issued access keys. A substantial advantage of the present method is that the control of the locking mechanism is not tied to a certain mobile terminal but that an authorized user can perform said control by means of different mobile terminals which are able to carry out a verification of the authorization. Hereinafter, instead of the term 'key', also the term 'admission certificate' or 'access certificate" will be used which can contain additional data, for instance authorizations, etc.

Advantageously, by means of the mobile terminal a connection to an existing identity provider is established in order to obtain the key for the opening of the locking mechanism. By the use of established identity providers, the registration and issuance of additional access data along with the problems of transmission security, storage, etc. involved therewith do no longer apply. The result on the side of the user is that altogether less user data have to be managed or maintained which, in turn, can also contribute to the security. On the other hand, the implementation and the operation of an authentication system on the side of the operator or carrier along with the (security) considerations required therefor become unnecessary. Instead thereof, said functionality is delegated to one (or several) trusted identity providers. The method also allows the issuance of admission or access authorizations to individuals without a physical meeting with the issuing entity (person or device) being necessary. The delegation of the authentication is already well established in virtual systems, and the translation into physical admission or access systems, as described in the present method, transports the respective advantages into the "real" world.

The locking mechanism is for instance controlled by means of a smartphone, a computer or the like as a mobile terminal.

For the control of the locking mechanism, by and from the mobile terminal a near field communication (NFC) connection, a high frequency connection, a Bluetooth connection and/or a WLAN connection will be established as the local data connection to the locking mechanism. Smartphones mostly have one or several of such connection possibilities.

When the locking mechanism has no connection to the authorization entity, the key for the opening of the locking mechanism will be transmitted from the authorization entity to the mobile terminal and from the mobile terminal via the local data connection to the locking mechanism. This is referred to as the so-called offline method.

When a connection between the locking mechanism and the authorization entity is established via the network, the key for the opening of the locking mechanism can also be transmitted directly from the authorization entity to the locking mechanism. This is referred to as the so-called online method.

Prior to the opening of the locking mechanism, additional preset conditions, in particular time constraints, can be queried. Thereby the control of the locking mechanism can be associated with such additional conditions, for instance special times at which an access is possible, or an expiration date of the key.

The initialization of the local data connection between the mobile terminal and the locking mechanism can be triggered by a physical interaction with the mobile terminal, for instance the operation of an operating element at the mobile terminal or the performance of a movement with the mobile terminal, in particular into the vicinity of the locking mechanism. In case of a local data connection in the form of an NFC communication, the initialization of the connection is caused by the fact that the mobile terminal is brought within the direct proximity (10 cm) of the locking mechanism.

Preferably, a data packet with a unique identification is sent from the locking mechanism to the mobile terminal. Thereby, the locking mechanism can be uniquely assigned.

The object according to the invention is also solved by a control device of the above-mentioned kind, in which the authorization entity is designed to issue a key after the transmission of an authentication information from the identity provider to the mobile terminal and from the mobile terminal to the authorization entity in the network and after the verification of the authenticity of the user, with which key the locking mechanism can be opened. With regard to the advantages which can be achieved thereby, reference is made to the above description with respect to the control method. The network in which the at least one identity provider is located can be different from the network in which the authorization entity is located.

Advantageously, the mobile terminal is formed by a smartphone, a computer or the like.

The means for the creation of the local data connection can be formed by a near field communication (NFC) transmitter, an RFID transponder, a Bluetooth transmitter and/or by a WLAN router.

Advantageously, the mobile terminal is designed to receive the key from the authorization entity.

Also the locking mechanism can comprise means for the connection to the authorization entity via the network so that the key for the opening of the locking mechanism can be transmitted from the authorization entity to the locking mechanism. Said variant is characterized by a higher expenditure, enables, however, a quick adaptation to changed situations as changed information can be transmitted from the authorization entity to the locking mechanism.

When the transmission of the key for the opening of the locking mechanism is dependent on additional conditions, in particular time constraints, a higher security can be obtained.

The user interface of the mobile terminal is preferably formed by a touchscreen which is the input and output possibility at the mobile terminal. The interaction of the user with the mobile terminal can, however, also be carried out via a voice control, a keyboard, etc.

The invention will now be explained in more detail by means of the accompanying drawings, wherein.

Figure 1:
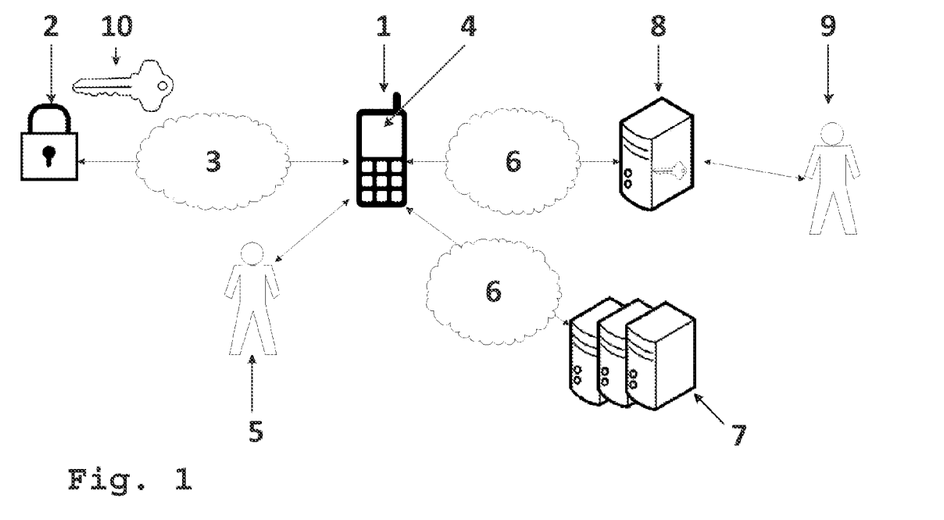
FIG. 1 is a schematic block diagram of an inventive device for the control of a locking mechanism by means of a mobile terminal without any connection of the locking mechanism to an authorization entity (offline method)

FIG. 1 shows a schematic block diagram of an inventive device for the control of a locking mechanism 2 by means of a mobile terminal 1 without any connection of the locking mechanism to an authorization entity (offline method). The mobile terminal 1 is an electronic device which is able to communicate with the user 5, an authorization entity 8, as well as with the locking mechanism 2. Said communications need not necessarily take place simultaneously. A locking mechanism 2 is deemed to be a technical device, which grants an admission to or an access to a thing or object (e.g. doors or automatic machines/automats/vending machines). The locking mechanism 2 has to be able to communicate with the mobile terminal 1 and to execute software which satisfies the requirements of the described method. The user 5 is that individual that wants to release the locking mechanism 2. Typically, the user 5 is a human being; but—albeit with reservations—also an animal, a robot, a vehicle, etc. can be such a user 5. The mobile terminal 1 is able to execute a software program which satisfies the requirements of the inventive method. The mobile terminal can for instance be a mobile phone, in particular a smartphone, a computer, for instance a tablet PC; it can, however, also be formed by other appliances, for instance a vehicle, by means of which the locking mechanism 2 shall be controlled. The mobile terminal 1 is able to establish a connection with a network 6, in particular the Internet, and to communicate with appliances which are connected with the network 6. For instance, there is provided an identity provider 7 in the network 6. Said identity provider 7 is an entity in which the user 5 as well as an authorization entity 8 trust and which is able to authenticate the user 5. The identity provider 7 can be placed in a distinct network 6, like the authorization entity 8. According to the described method, one identity provider 7 or several identity providers 7 can be provided. Examples of existing identity providers 7 are:

Google ID
Windows Live ID
Google Identity Toolkit
LDAP (Lightweight Directory Access Protocol)
Windows Active Directory
Open-ID
OAuth To the network 6 (which can differ from the network 6 in which the identity provider 7 is located) there is further connected an authorization entity 8 which can for instance be formed by a server computer. The authorization entity 8 manages and administers admission or access authorizations for the locking mechanism 2 and issues certificates which enable the admission to or the access to a thing or object. The authorization entity 8 is managed by an administrator, said administrator being a person or an entity issuing admission or access authorizations and configuring said authorizations via a suitable tool to the authorization entity 8. Finally, also a software provider (not shown) can be provided in the network 6. From said software provider the mobile terminal 1 can obtain the software required for the described method in order to install said software locally. The software provider has to be trustworthy for the user 5 as well as also for the authorization entity 8.

Figure 2:
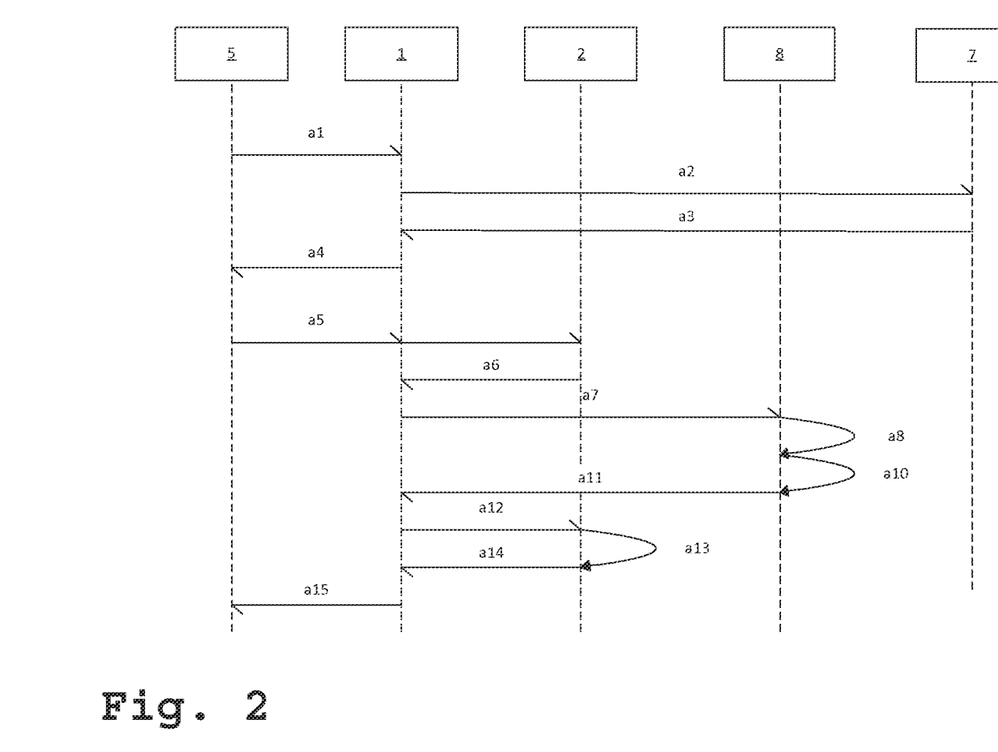
FIG. 2 is a schematic flow chart of an inventive offline method for the control of a locking mechanism by means of a mobile terminal.

In FIG. 2 there is shown a schematic flow chart of an inventive offline method for the control of a locking mechanism 2 by means of a mobile terminal 1. There are several variations for the implementation of the described control method with regard to the sequence and the concrete implementation, which, however, are irrelevant for the actual core of the coupling of a physical locking mechanism 2 to a virtual identity with delegated authentication. The method can include the following aspects:

- A user 5 uses a mobile terminal 1 in order to authenticate himself/herself/itself at an identity provider 7 in which the authorization entity 8 trusts (steps a1-a4). The steps a1-a4 will only be carried out if there is not yet a valid key 10 present at the mobile terminal 1 or the key's period of validity has expired. Said procedure is triggered by a first contact of the mobile terminal 1 with the locking mechanism 2 via the local data connection 3 (e.g. via an NFC connection, a Bluetooth connection, WLAN, etc.). Said process is impossible when no connection to a network 6, in particular the Internet, can be established. Alternatively, the authentication process can also be explicitly initiated by the user 5.
- The mobile terminal 1 communicates with the locking mechanism 2 via said local data connection 3 in order to exchange the identity (steps a5, a6, a15).
- The user 5 can use the authentication carried out at the identity provider 7 in order to also authenticate himself/herself/itself at the authorization entity 8 (steps a7-a8). In case of an online connection between the mobile terminal 1 and the authorization entity 8, this can be carried out by the fact that an authentication token is transmitted from the identity provider 7 to the mobile terminal 1 and then from the mobile terminal 1 to the authorization entity 8. Said authorization entity 8 can confirm the authenticity to the locking mechanism 2. When an online connection exists between the locking mechanism 2 and the authorization entity 8, the authorization token can also be transmitted from the mobile terminal 1 to the locking mechanism 2 and then from the locking mechanism 2 on to the authorization entity 8.
- The authorization entity 8 is able to verify the authenticity of a user 5 by means of the forwarded authentication features and to make a decision on the admission or access authorizations of the user 5 on the basis thereof (steps a8-a10).
- If an admission or access is to be granted, the authorization entity 8 informs the locking mechanism 2 thereof in a suitable manner. In case of an online connection between them, the notification can be made directly, alternatively also the mobile terminal 1 can be used as a conveying entity therefor (step a11). The steps a7 to a11 will only be carried out if there is not yet a valid key 10 present at the mobile terminal 1 or if there is not yet a valid admission or access certificate present. If, at that time, no connection to the authorization entity 8 can be established by means of the mobile terminal 1 (e.g. no connection with the Internet is possible), this could also be triggered explicitly by the user 5 at an earlier point in time.
- According to step a12, the locking mechanism 2 is released by the mobile terminal 1. The admission authorization can be associated with further conditions, as for instance date of expiration, time window, etc. The admission authorization can be buffered by the mobile terminal 1 or by the locking mechanism 2 in order to reduce the number of the required interactions between the individual components in case of future accesses. The locking mechanism 2 checks the key 10 or the admission or access certificate and the received information and on the basis thereof grants or refuses the admission or the access (step a13). According to step a14, the success of the opening process is notified to the mobile terminal 1 and is passed on from the mobile terminal 1 via the user interface 4 to the user 5.

One example of application for the present control method is the control of a locking mechanism of a remote mountain but which is rented out by a landlord to a customer or user 5. The landlord and the customer are locally separated, a personal meeting is difficult or would be cumbersome. The customer has a mobile terminal 1 in the form of a smartphone with an NFC functionality and also has an e-mail address which, at the same time, represents his/her identity. The user 5 of the mobile terminal 1 can for instance have an e-mail address at Google (Gmail) which, at the same time, represents his/her Google ID. The landlord grants the customer or his/her Google ID access to the but via the described authentication method and limited to the agreed term of lease. Advantageously, a personal meeting of the landlord with the customer is not necessary. After expiration of the term of lease, the admission or access authorization expires reliably. A data connection is only required for the exchange of the key, but not at the but on the spot.

Figure 3:
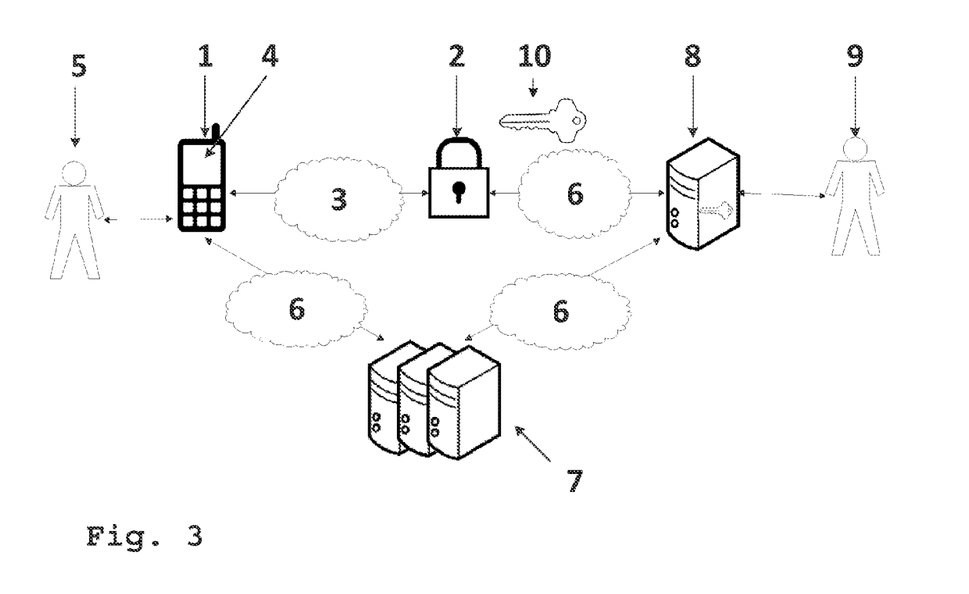
FIG. 3 is a schematic block diagram of another embodiment of an inventive device for the control of a locking mechanism by means of a mobile terminal with a connection of the locking mechanism to an authorization entity (online method)

FIG. 3 shows a schematic block diagram of another embodiment of an inventive device for the control of a locking mechanism 2 by means of a mobile terminal 1, wherein a connection between the locking mechanism 2 and the authorization entity 8 exists and is used (online method). There does not exist any direct connection between the mobile terminal 1 and the authorization entity 8. Said data connection is used in order to forward authentication information from the mobile terminal 1 to the authorization entity 8 as well as in order to put forward and to reply to authorization requests. Furthermore, in said variation a direct data connection between the authorization entity 8 and the identity provider 7 is used in order to check the authentication information and to exchange user data.

Figure 4:
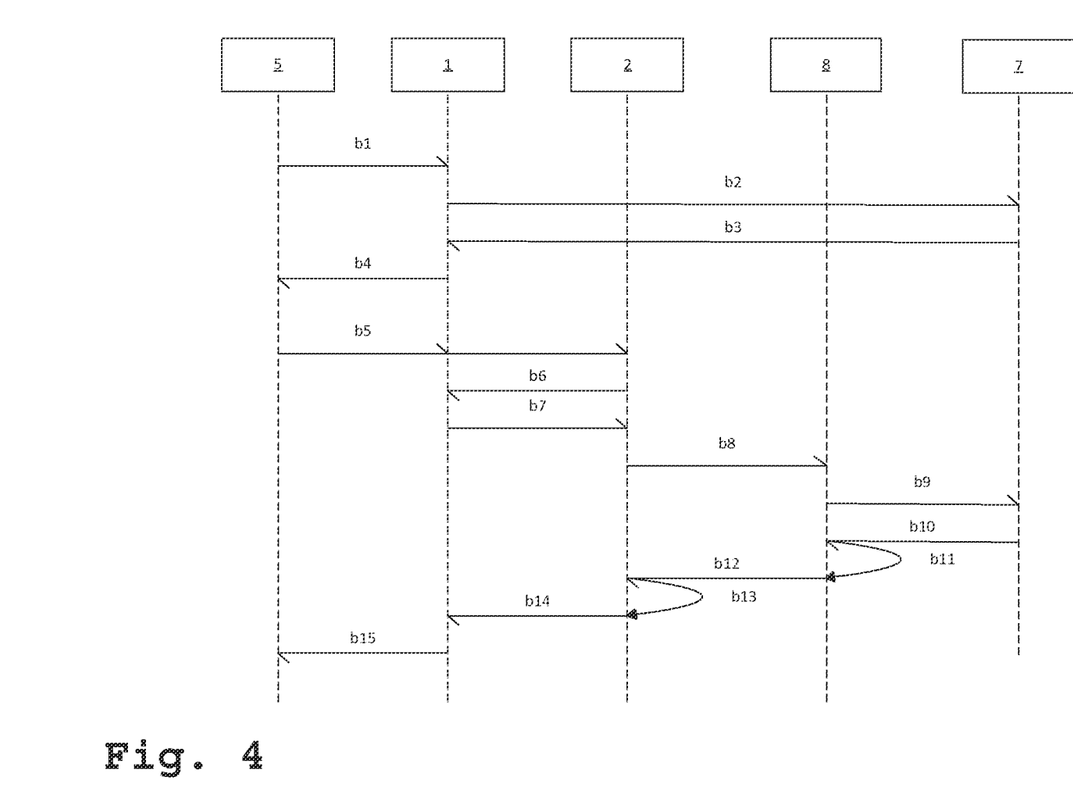
FIG. 4 is a schematic flow chart of a further embodiment of an inventive online method for the control of a locking mechanism by means of a mobile terminal.

FIG. 4 shows a schematic flow chart of a method for the control of a locking mechanism 2 by means of a mobile terminal 1 in the embodiment according to FIG. 3 (online method). The steps b1 to b4 correspond to the steps a1 to a4 as described in FIG. 2 which are only carried out when there is not yet a valid key 10 present at the mobile terminal 1 or when the key's period of validity has expired. Also the steps b5 (establishing a contact between the user 5, the mobile terminal 1 and the locking mechanism 2) and b6 (notification of the identity of the locking mechanism 2 to the mobile terminal 1) correspond to the steps a5 and a6 of the sequence according to FIG. 2. According to the method step b7, the locking mechanism 2 is triggered by the mobile terminal 1. Thereupon an authorization request is sent from the locking mechanism 2 to the authorization entity 8 (step b8) and the identity certificate is checked according to step b9. In step b10, the at least one identity provider 7 confirms the identity to the authorization entity 8 which, in turn, checks the admission authorization (step b11). In step b12, the authorization of the locking mechanism 2 by the authorization entity 8 takes place. The verification of the identity certificate on the part of the authorization entity 8 (steps b9 to b11) can also be omitted if the validity is checked in any other manner, e.g. by means of a former verification or a digital signature. The locking mechanism 2 checks the authorization and releases the locking mechanism (step b13). Then the success can additionally be notified to the mobile terminal (step b14) and a corresponding information can be transmitted to the user 5 via the user interface 4, and the contact between the mobile terminal 1 and the locking mechanism 2 can be terminated (step b15).

Figure 5:
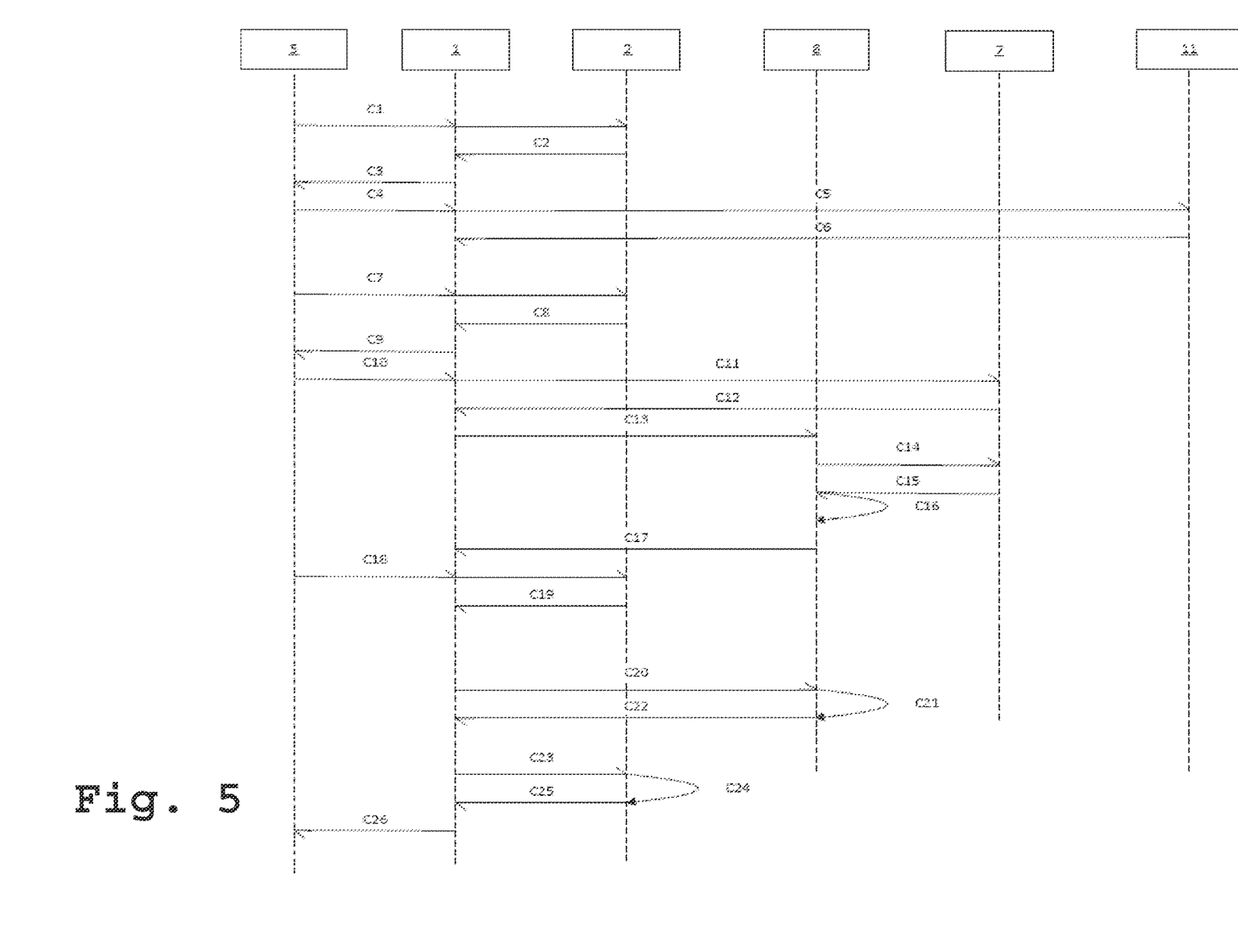
FIG. 5 is a schematic flow chart of another embodiment of an inventive offline method for the control of a locking mechanism by means of a mobile terminal.

Finally, FIG. 5 shows a schematic flow chart of another embodiment of an inventive offline method for the control of a locking mechanism 2 by means of a mobile terminal 1. In step c1, the user 5 brings the mobile terminal 1 into the vicinity of the locking mechanism 2 so that a local data connection 3 can be established. The explicit activation of the locking mechanism 2 can also be triggered by means of a physical interaction with the mobile terminal 1 (e.g. by pressing an operating element, turning or moving the mobile terminal 1, etc.). The locking mechanism 2 then informs the mobile terminal 1 of its identity (step c2). This can be carried out via different mechanisms depending on the kind of the local data connection 3. In the case of an NFC connection, the transmission can for instance be carried out as follows: The mobile terminal 1 establishes an electrical field. The locking mechanism 2 recognizes the electrical field and passes itself off as an NDEF tag (emulation mode). The returned data contain an indication to the identity of the locking mechanism 2 as well as an indication for the mobile terminal 1 as to from where the required software can be obtained, if necessary. The locking mechanism 2 furthermore generates a so-called challenge, stores it locally and returns it to the mobile terminal 1. Said challenge is a data packet which is created such that a new challenge will be created every time the contact is established. It has to be guaranteed that the content of a created challenge corresponds as rarely as possible to the content of a previously created challenge. A sensible implementation of the generation of said challenge would for instance be the generation of a pseudo-random byte sequence with a length of 16 bytes. After the generation of a new challenge, the challenge generated last will be discarded, i.e. there will always only be one current such challenge at the locking mechanism 2. Said challenge will be used in order to subsequently authenticate the mobile terminal with respect to the locking mechanism. As an additional precautionary measure, the identity of the locking mechanism 2 can be returned in an encrypted form. For that purpose, the data block which contains the identity is supplemented by randomly generated data. The resulting data block will be encrypted in such a manner that it can only be decrypted by authorized entities (above all by the authorization server). Symmetric as well as asymmetric encryption methods are suitable therefor. When choosing a suitable encryption method, by the supplementation of the identity with random data it has to be guaranteed that the returned encrypted data block varies each time. For observers who do not have the decryption key the data block appears to be random and cannot be used for the recurring identification of the locking mechanism.

The mobile terminal 1 analyses the received data block. By means of the indication to the software to be used, said software will be started at the mobile terminal 1 (in case of a communication with an Android terminal via NFC this can be effected e.g. via an Android Application Record). If the corresponding software is not present at the mobile terminal 1, said mobile terminal 1 shall be induced to display an indication with regard to the software installation or to initiate the installation by itself, and the sequence will be continued at step c3, otherwise steps c3 to c8 will be omitted.

According to step c3, the mobile terminal 1 supplies corresponding information to the user 5 via the user interface 4 and terminates the local data connection 3 to the locking mechanism. If the software is not yet installed on the mobile terminal 1 when the contact with the locking mechanism 2 takes place and the locking mechanism 2 returns an indication as to how it is to be proceeded by the mobile terminal 1 in case of lack of the required software, the mobile terminal 1 can follow said indication and can substantially simplify the installation of the software for the user. The kind of the indication can be different for different types of mobile terminals 1. For this reason, different indications can be output for the different types of locking mechanisms 2. In the case of an NFC connection, for instance, a URL can be supplied from which the software can be obtained which offers further information as soon as it is opened in a web browser. For mobile terminals 1 with the Android operating system in the version >=4.0, an Android Application Record can be supplied which instructs the operating system to start the respective app or, alternatively, if said app should not yet be installed, to start an app which enables the software installation. The software installation itself can require an interaction of the mobile terminal 1 with the user 5, as is for instance the case when installing software on terminals with the Android operating system via the Google Play App. Typically, before or during the software installation, the connection between the mobile terminal 1 and the locking mechanism 2 is disconnected. In the case of an NFC connection, the connection can only be maintained over the distance of a few centimetres and often only over a limited period of time. As the software installation in the majority of cases requires a user interaction, typically the user 5 will take the mobile terminal 1 away from the locking mechanism 2 in order to carry out the interaction. Thereby the connection to the locking mechanism 2 is disconnected. Furthermore, the software installation generally lasts too long in order to maintain the connection. If the connection breaks off, the method starts once again from the beginning after a successful software installation and a new contact between the locking mechanism 2 and the mobile terminal 1. If, however, the connection to the locking mechanism 2 should be effected via a local data connection 3 which allows for a longer and locally long-ranging connection, a disconnection of the connection is not necessarily required. The general method is independent of said detail.

After the software installation has been carried out, the user 5 brings the mobile terminal 1 once again into the vicinity of the locking mechanism 2 so that a local data connection 3 can be created (step c7). As already mentioned above, the explicit activation of the locking mechanism 2 can also involve a physical interaction (pressing of an operating element, turning or moving the mobile terminal 1).

In step c8, the locking mechanism 2 transmits once again identification data to the mobile terminal 1 (see step c2). This time, the software installed beforehand at the mobile terminal 1 will be started automatically.

The steps c3 to c8 will only be carried out if the software had not yet been installed at the mobile terminal 1.

The software at the mobile terminal 1 now checks whether a valid authentication key for the authentication with respect to the authorization entity exists. If not, then the user 5 will be informed thereon by displaying a login dialogue (steps c9 and c10), otherwise steps c9 to c19 will be skipped.

As during the software installation, generally also during the authentication process the connection between the locking mechanism 2 and the mobile terminal 1 will be disconnected.

According to step c11, in the authentication process the user 5 selects one of the identity providers 7 in which the authorization entity 8 trusts. The authentication sequence can for instance be executed via a web browser. Examples for such authentication methods are OpenID and Google Identity Toolkit. In such a case, the selection of the identity provider 7 can be effected via a website which is provided by the authorization entity 8, but the selection can also be effected via data stored locally on the mobile terminal 1. As a result of a successful authentication, the identity provider 7 transmits to the mobile terminal 1 a data block which is suitable for uniquely identifying the authenticated user, either by sending once again the data block to the identity provider 7 which returns user information, or by the fact that the data block was digitally signed by the identity provider 7 so that it can be trusted that said data block originates from the identity provider 7 and was not manipulated (step c12).

According to method step c13, the transmission of the identity certificate—received beforehand from the identity provider 7—from the mobile terminal 1 to the authorization entity 8 is carried out either automatically via the web browser or explicitly via the application software at the mobile terminal 1. If the authentication sequence is executed over a web browser, the forwarding of the identity certificate to the authorization entity 8 can be carried out via a HTTP Redirect. Alternatively, the software at the mobile terminal 1 can explicitly read out the identity certificate and can transmit it by means of a suitable method to the authorization entity 8. In any case, however, it is essential that the transmission of the identity certificate or of the proof of identity is carried out such that the confidentiality is maintained (e.g. by an SSL encryption in the case of an HTTPS connection).

In the steps c14 to c17, the authorization entity 8 checks the validity of the identity certificate. This is either carried out such that the identity certificate is transmitted to the identity provider 7 and that it is waited for the confirmation of the authenticity thereof by the identity provider 7 and for additional user data, if necessary, or such that the digital signature of the identity certificate is checked. In either case, a user identification which is unambiguous or unique for the respective identity provider 7 has to be transmitted to the authorization identity 8. In the first case, this can occur as a part of the verification result from the identity provider 7, or in the second case this can occur as a part of the signed identity certificate itself. If the validity of the identity certificate cannot be ascertained, the further course of the method will be cancelled. In particular no access rights will be granted to the user 5 or the requesting counterpart. The user identification contains a human-readable trustworthy part by means of which a person granting admission or access authorizations (the administrator) can clearly recognize the respective user 5. Said part can for instance be the e-mail address of the user 5 which was checked by the identity provider 7. In any case, for the purpose of the manual identification only such features may be consulted which are classified as trustworthy by the identity provider 7 so that no erroneous confusion of users 5 can occur. The first name and the surname of a user 5 cannot be classified as trustworthy in many cases (e.g. in case of public identity providers 7 like Google), as said names are not checked by the identity provider 7. In other cases, e.g. if as an identity provider 7 the LDAP server of a company is used the data of which are only maintained by a trustworthy staff, such data can perfectly be regarded as trustworthy. The user identification also contains a machine-readable unchangeable part which can be used for the recurring identification of a user 5. The unchangeable part can be, but need not be, identical to the part which can be read by the user. For example the e-mail address of a user 5 could definitely be changed, while the user 5 himself/herself/itself and, consequently, his/her/its machine-readable unchangeable identification remains the same. After a successful and credible checking of the identity certificate, the authorization entity 8 checks whether there already exists an entry in the user database which corresponds to the newly authenticated user 5. In detail, this can be carried out as follows:

It is checked whether an existing entry with the unchangeable user identification exists which had been verified by the same identity provider. If so, then it is assumed that the entry corresponds to the newly authenticated user 5, and in case of a change of data of the user 5 said data will be updated. If no such entry is found, an entry which had been checked by the respective identity provider 7 and the user identification of which comprises a human-readable part which corresponds to the newly authenticated user 5 is searched in the user database. If this is the case, it is assumed that this is an entry which corresponds to the newly authenticated user 5. Said case could occur when a user 5 had been created in the database by an administrator before said user 5 authenticated himself/herself/itself via an identity provider 7. This can be useful if admission authorizations are granted to a user 5 before said user 5 uses the described method for the first time. In this case, the administrator 9 would only know the human-readable part of the user identification (e.g. his/her e-mail address), but not the machine-readable unchangeable part. Consequently, in this case the found data record may not comprise a permanent, machine-readable part. If, however, said data record comprises such a permanent, machine readable part, this is an error case which has to be treated correspondingly. If no existing data record is found for the newly authenticated user 5, this data record will be newly created. The described mechanism for the creation or recognition of an authenticated user 5 is an implementation example which, in concrete implementations, can also be realized in another manner or with a higher security, if necessary. For the newly authenticated user 5 a secret, secure authentication key is generated via which the mobile terminal 1 of the user 5 can authenticate itself in case of future requests without having to carry out the described authentication process via the identity provider 7 once again. Said authentication key can be the data block transmitted by the identity provider 7 in case said data block can be validated several times. It can also be a secret key which is generated just once for a user 5 and then is output to each mobile terminal 1 at which the respective user 5 logs in. Normally, however, a new authentication key is generated for each new authentication of the user 5. The authentication key can for instance be a pseudo-random sequence of 128 bytes. The authentication key is provided with an expiration date. After said expiration date the key can no longer be used for the access to the authorization entity, and a new authentication process has to be gone through. The authentication key together with the date of validity and a unique identification of the user 5 will be stored in the database of the authorization entity. Alternatively, said data can also be combined into a data packet and can be digitally signed by the authorization entity 8. In the first case, the generated authentication key itself and the pertaining expiration date will be transmitted to the mobile terminal 1, and in the second case the signed data packet will be transmitted to the mobile terminal 1. In any case, the transmission has to be carried out in a confidential manner. The mobile terminal 1 stores the received authentication data locally so that said data can be used for subsequent requests. Preferably, the storage has to be carried out such that no unauthorized access thereto will be possible.

After the authentication has been carried out, the user 5 brings the mobile terminal 1 once again into the vicinity of the locking mechanism 2 so that a local data connection 3 can be created (step c18). Here, once again the explicit activation of the locking mechanism 2 by means of a physical interaction of the mobile terminal can be involved. In step c19, the identity of the locking mechanism 2 is sent to the mobile terminal (see steps c2 and c8).

The authorization with respect to the locking mechanism 2 is carried out via an admission or access certificate which is issued separately for the respective locking mechanism 2 by the authorization entity, respectively (step c19). The mobile terminal 1 checks whether it already has such an admission or access certificate. If so, then the steps c20 to c22 are skipped. If not, then the software at the mobile terminal 1 requests said admission or access certificate from the authorization entity 8 (step c20). For this purpose, a request with the identity information of the locking mechanism 2 is transmitted to the authorization entity 8.

Later, during the communication with the locking mechanism 2, the mobile terminal 1 has to authenticate itself with a separate key. In order that the locking mechanism 2 can trust said key, also said key has to be signed by the authorization entity 8. For this purpose, symmetric as well as asymmetric methods can be used, wherein normally asymmetric methods can be regarded as providing better security. In symmetric methods, additional measures for guaranteeing the confidentiality can be taken. In this document, subsequently the use of an asymmetric cryptographic method is assumed. In this case, a pair of keys consisting of a private key and a public key is generated by the software at the mobile terminal 1 (subsequently referred to as the private and public signing key of the mobile terminal 1). The public key is sent together with the request for the issuance of a key to the authorization entity 8. For the authentication of the request with respect to the authorization entity 8, also the authentication key which was received beforehand will be sent together therewith. Said authentication key can be sent together therewith in different manners. In any case, it is important (as for most of the data connections in the described method) that the confidentiality is maintained.

Alternatively, instead of sending the authentication key together with the request, said authentication key can also be used in order to digitally sign the request.

The authentication key transmitted by the mobile terminal 1 is searched for in step c22 by the authorization entity 8 in its database; if such a key is found, then the period of validity is checked. If the authentication key is not found or if said key has expired (or is not yet valid), the issuance of an admission or access key is refused and the further method will be cancelled.

Otherwise it will be checked in the database of the authorization entity 8 whether the user 5, for whom the received authentication key was issued, shall gain admission or access to the requested locking mechanism 2. If this is not the case, the method will be cancelled. Otherwise a data packet will be created which describes the basic conditions of the granted access or admission. Said basic conditions comprise at least the identity of the one or several locking mechanisms 2, an indication of time until when the key will be valid, and the public signing key of the mobile terminal 1.

Optionally, also further information can be comprised, like e.g. daily time windows during which the admission is granted, etc. The data packet will be treated by means of a cryptographic method such that the locking mechanism 2 can reliably determine that the data packet was issued by the authorization entity 8 or any other trusted entity. For this purpose, symmetric as well as asymmetric methods are suitable. The signed and encrypted data packet (which will be referred to as admission or access certificate in the following) will be transmitted back to the mobile terminal 1.

For releasing the locking mechanism 2, the software at the mobile terminal 1 creates a data packet with the following content (step c23):

admission or access certificate, as received beforehand from the authorization entity 8 challenge, as received last from the locking mechanism 2.

The software at the mobile terminal 1 signs said data packet with the private signing key of the mobile terminal 1. The signed data packet will be transmitted to the locking mechanism 2. In the case of a data transmission via NFC, the data packet can for instance be transmitted as an NDEF APDU.

According to step c24, the locking mechanism 2 checks whether the challenge contained in the received data packet corresponds to the one which was issued last by the locking mechanism 2. If this is not the case, then the process will be cancelled. Otherwise, the admission or access certificate will be read out. If said certificate had been encrypted, now said admission or access certificate would be decrypted with the separate private key (or in case of a symmetric encryption with the symmetric key). If this decryption would fail, the process would be cancelled. It will be checked whether the signature of the admission or access certificate was generated with the private key of the authorization entity. For this purpose, the locking mechanism 2 uses the public key of the authorization entity 8 which is present at the locking mechanism 2. If the validity of the signature cannot be determined, the process will be cancelled. Now the public signing key of the mobile terminal 1 will be read out from the unencrypted admission or access certificate. With the help thereof it will be checked whether the signature of the data packet received from the mobile terminal 1 was created with the private signing key of the mobile terminal 1. If this is not the case, the process will be cancelled. It will be checked whether in the admission or access certificate the proper ID of the locking mechanism 2 is included in the list of the locking mechanisms 2 to be opened. If this is not the case, the process will be cancelled. Otherwise the basic conditions will be read out (above all the expiration date of the certificate or the granted periods of time) under which the release of the admission mechanism is allowed. When these basic conditions are fulfilled, the locking mechanism 2 will be released, otherwise the process will be cancelled.

After an effected or not effected operation of the locking mechanism 2, the locking mechanism 2 notifies the success or failure to the mobile terminal 1, so that the mobile terminal 1 can inform the user 5 correspondingly (step c25).

The invention claimed is:

1. A method for the control of a locking mechanism by a user with a mobile terminal, comprising:
    establishing a local data connection from the mobile terminal to the locking mechanism in order to control the locking mechanism;
    establishing a connection from the mobile terminal via an Internet network to an identity provider separate from the locking mechanism;
    authenticating the user at the identity provider with the mobile terminal;
    sending an authentication information from the identity provider to the mobile terminal;
    sending the authentication information and a locking mechanism identification from the mobile terminal to an authorization entity in the Internet network, wherein the authorization entity is separate from the locking mechanism and the identity provider;
    checking, at the authorization entity, the authenticity of the user with the received authentication information;
    determining, at the authorization entity, whether a user identified by the authentication information is authorized to gain admission or access to the locking mechanism identified by the locking mechanism identification according to a user database of the authorization entity;
    issuing a key at the authorization entity upon determining that the user is authentic and authorized; and
    opening the locking mechanism with said key.

2. The control method of claim 1, wherein for the reception of the key for the opening of the locking mechanism with the mobile terminal, a connection to an existing identity provider is established.

3. The control method of claim 1, wherein the locking mechanism is controlled with a smartphone, a computer, a tablet computer, or a vehicle.

4. The control method of claim 1, wherein for the control of the locking mechanism, a near field communication (NFC) connection, a high frequency connection, a Bluetooth connection and/or a WLAN connection is established as said local data connection from the mobile terminal to the locking mechanism.

5. The control method of claim 1, wherein the key for the opening of the locking mechanism is transmitted from the authorization entity to the mobile terminal.

6. The control method of claim 1, wherein a connection between the locking mechanism and the authorization entity is established via the Internet network, and that the key for the opening of the locking mechanism is transmitted from the authorization entity to the locking mechanism.

7. The control method of claim 1, wherein prior to the opening of the locking mechanism, additional preset conditions are queried.

8. The control method of claim 7, wherein the preset conditions queried are time constraints.

9. The control method of claim 1, wherein the initialization of the local data connection between the mobile terminal and the locking mechanism is triggered by a physical interaction with the mobile terminal, for instance by the operation of an operating element at the mobile terminal or the performance of a movement with the mobile terminal into the vicinity of the locking mechanism.

10. The control method of claim 1, wherein from the locking mechanism a data packet with a unique identification is sent to the mobile terminal.

11. A mobile terminal for the control of a locking mechanism by a user, said with a mobile terminal comprising:
    a user interface;
    a local data connection interface configured to establish a local data connection; and
    an Internet network connection interface configured to establish a connection to at least one Internet network;
    wherein the mobile terminal is configured to:
        connect to the locking mechanism via the local data connection;
        connect to an identity provider separate from the locking mechanism via the Internet network and connect to an authorization entity separate from the locking mechanism and the identity provider via the Internet network;
        log in to the identity provider with the mobile terminal;
        receive a transmission of an authentication information from the identity provider to the mobile terminal;
        send a transmission of the authentication information and a locking mechanism identification from the mobile terminal to the authorization entity in the Internet network;
        receive a key issued by the authorization entity after the authorization entity verifies the authenticity of the user with the authentication information, and after the authorization entity verifies the authorization of the user with a user database of the authorization entity; and
        open the locking mechanism with the key.

12. The mobile terminal of claim 11, wherein the mobile terminal is formed by a smartphone, a computer, a tablet computer, or a vehicle.

13. The mobile terminal of claim 11, wherein the local data connection interface for establishing the local data connection is formed by a near field communication (NFC) transmitter, an RFID transponder, a Bluetooth transmitter and/or by a WLAN router.

14. The control device mobile terminal of claim 11, wherein the mobile terminal is designed for the reception of the key from the authorization entity.

15. The mobile terminal of claim 11, wherein the locking mechanism is configured to connect with the authorization entity via the Internet network so that the key for the opening of the locking mechanism can be transmitted from the authorization entity to the locking mechanism.

16. The mobile terminal of claim 11, wherein the transmission of the key for the opening of the locking mechanism is dependent on additional conditions.

17. The mobile terminal of claim 16, wherein the transmission of the key for the opening of the locking mechanism is dependent on time constraints.

18. The mobile terminal of claim 11, wherein the user interface of the mobile terminal is formed by a touchscreen.

19. The mobile terminal of claim 11, wherein the user interface of the mobile terminal is formed by a voice control.

20. The control method of claim 1, wherein before issuing the key at the authorization entity, transmitting a user identification to the authorization entity, wherein said user identification is unambiguous or unique for the identity provider.

21. The control method of claim 20, wherein said user identification comprises a human-readable trustworthy part and a machine-readable unchangeable part.

22. A method for the control of a locking mechanism by a user with a mobile terminal, comprising:
- establishing a local data connection from the mobile terminal to the locking mechanism in order to control the locking mechanism;
- establishing a connection from the mobile terminal via an Internet network to an identity provider separate from the locking mechanism;
- authenticating the user at the identity provider with the mobile terminal;
- sending an authentication information from the identity provider to the mobile terminal;
- after receiving, at the mobile terminal, the authentication information from the identity provider, sending the authentication information and a locking mechanism identification from the mobile terminal to an authorization entity in the Internet network, wherein the authorization entity is separate from the locking mechanism and the identity provider;
- checking at the authorization entity the authenticity of the user with the received authentication information;
- determining at the authorization entity whether a user identified by the authentication information is authorized to gain admission or access to the locking mechanism identified by the locking mechanism identification according to a user database of the authorization entity;
- issuing a key at the authorization entity upon determining that the user is authentic and authorized; and
- opening the locking mechanism with said key.

* * * * *